Sept. 18, 1934.   E. J. DE NORMANVILLE   1,974,329
HYDRAULICALLY OPERATED CONTROLLING DEVICE APPLICABLE
TO VARIABLE VELOCITY RATIO GEARING
Filed Nov. 27, 1931    3 Sheets-Sheet 3

INVENTOR
EDGAR J. de NORMANVILLE
BY
ATTORNEY

Patented Sept. 18, 1934

1,974,329

UNITED STATES PATENT OFFICE

1,974,329

HYDRAULICALLY OPERATED CONTROLLING DEVICE APPLICABLE TO VARIABLE VELOCITY RATIO GEARING

Edgar Joseph de Normanville, London, England, assignor to de Normanville Transmissions Limited, Coventry, England Application November 27, 1931, Serial No. 577,646
In Great Britain December 3, 1930

8 Claims. (Cl. 188—151)

This invention relates to hydraulically operated controlling devices applicable to variable velocity ratio gearing and provides means whereby, for example, alternative trains of gearing can be put into and out of operation by the adjustment of the position of a cam shaft effected by means of a rotary controlling handle, oscillatory lever, push rod or the like.

According to this invention, the hydraulically operated control gear comprises a series of valves served by a common distribution passage and a relief valve arranged in this passage, means being provided whereby, so long as a supply valve remains unclosed after the valve opening means have been withdrawn to allow the valve to close, the pressure in the supply pipe leading from this valve to the member or device actuated by liquid supplied thereto through this valve, cannot rise to a sufficient amount to be effective for operating the said member or device.

The said invention moreover comprises a relief valve arranged to open under variable pressures in the distribution passage to allow the pressure in the distribution passage to rise to a predetermined maximum in accordance with the pressure requisite to effect the operation of a member or device actuated by liquid supplied thereto from the said distribution passage. This arrangement can be employed to control the application of a series of brakes or like devices forming part of a variable velocity ratio gearing, so that, for example, a brake block can be moved through a sufficient distance to contact with a brake drum and the force applying the brake block to the drum can thereafter be progressively increased.

In the accompanying drawings:

Figure 6 is a side view of a member or device operated by liquid supplied thereto from the distribution passage above referred to.

Figures 7 and 8 are detail views drawn to a larger scale of a double seated valve hereinafter described.

Figure 1:
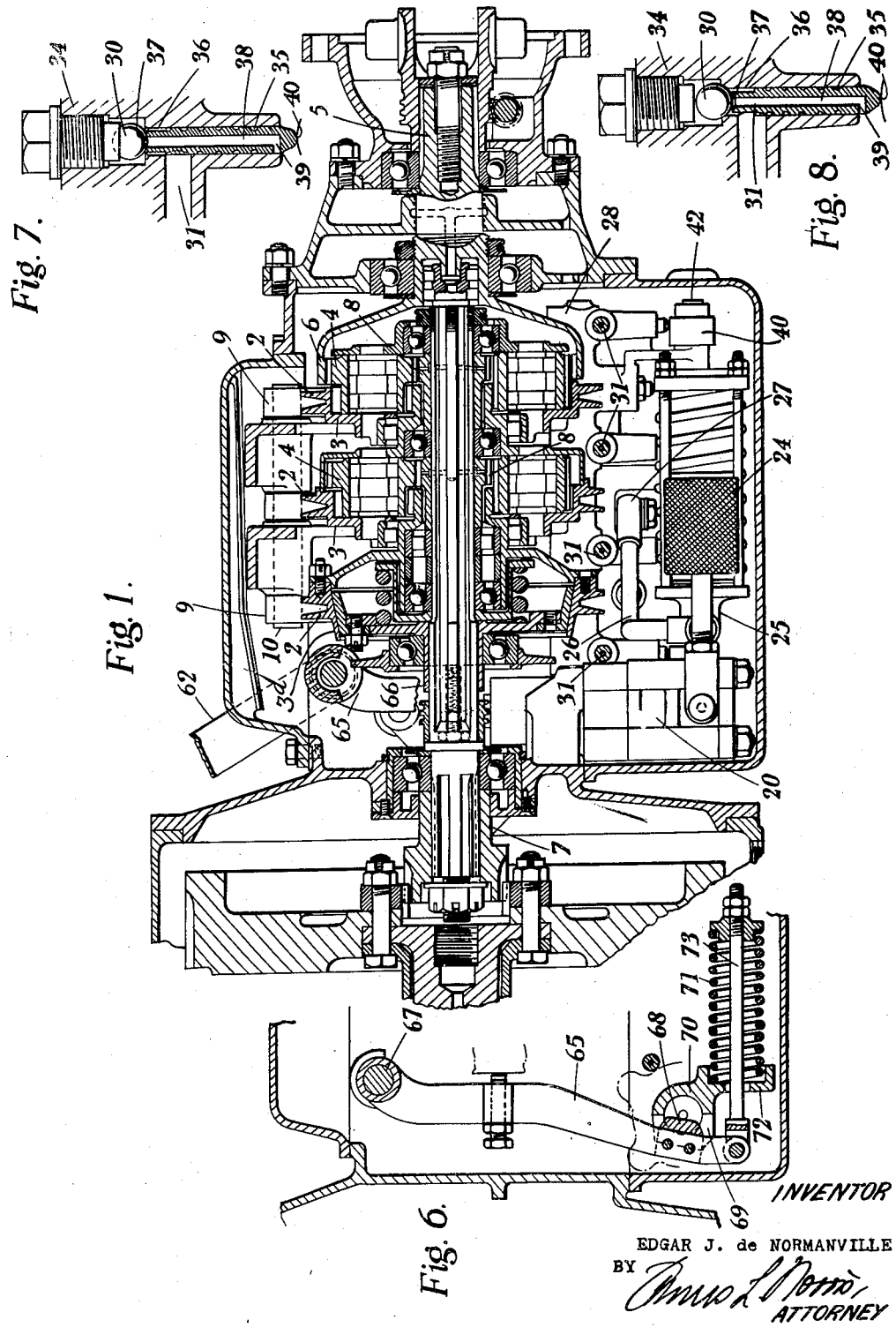
Figure 1 shows a vertical central section of variable velocity ratio gearing provided with controlling means in accordance with this invention.

As shown in the drawings, the improved gear comprises brake blocks 1 which are selectively operated to arrest the movement of one or more brake drums 2 carried by discs 3 carrying the trunnions of planet wheels 4, whereby the speed of rotation of a driven shaft 5 connected to an internally toothed gear 6 is determined with respect to the speed of a driving shaft 7 carrying sun wheels 8 in gear with the said planet wheels. An arrangement of variable velocity ratio gearing of this kind is described in U. S. Letters Patent No. 1,839,088, granted December 29, 1932 to me, but this construction of variable velocity ratio gearing is not essential to the present invention which can be applied without modification to any variable velocity ratio gearing of the type in which variations of the velocity ratio are effected by alternatively releasing or stopping the rotation of brake drums, or in which the controlling members can be moved by the operation of pistons movable in cylinders by fluid under pressure admitted thereto.

Figure 4:
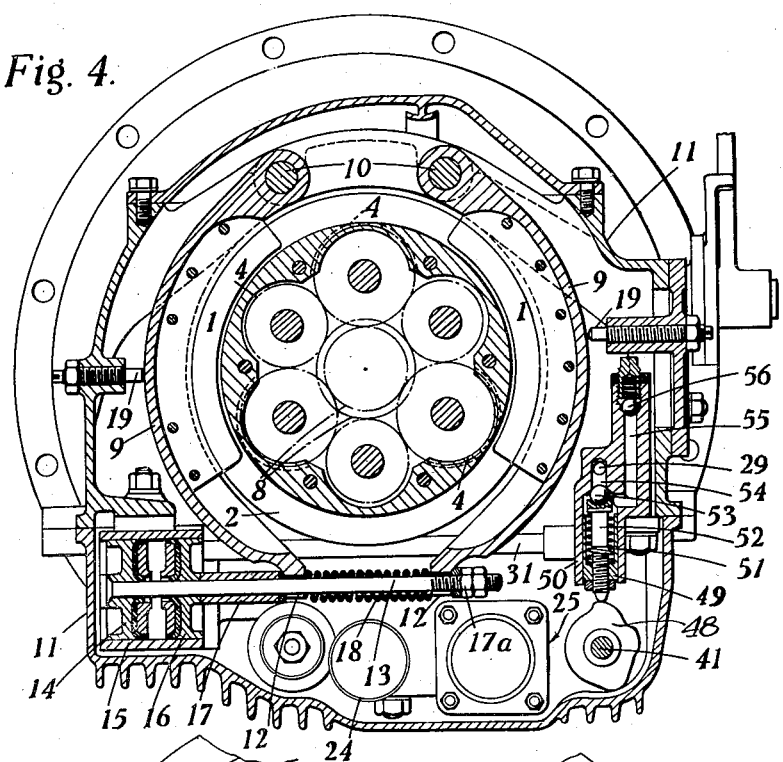
Figure 4 shows a section on the line 4—4, Figure 3.

The brake blocks 1, in pairs, one pair for each brake drum, are carried upon brake arms 9 (Figure 4) mounted on pivot pins 10 carried in convenient positions in a casing 11 enclosing the gear and having forks or eyes 12 at their ends. A piston rod 13 extends through said eyes and is secured to one piston 14 of a pair of pistons 14, 16 mounted in a cylinder 15. The other piston 16 of the pair is slidably mounted on the rod 13 and has an extension 17 abutting against one of a pair of arms 9 whilst a collar or nut 17a on the rod 13 abuts against the other arm 9 of the pair, a spring 18 being interposed between the two arms. The outward movement of each arm is limited by an adjustable stop 19. By admitting fluid under pressure between the pistons equal forces will be exerted on the arms 9 by the drawing together of the extension 17 and the collar or nut 17a, the force which tends to cause the brake blocks to rotate with the brake drum 2 being resisted by the pivot pins 10, and the pistons 14, 16 being free to take up positions determined by the positions of the arms. The movement of the arms 9 is limited by contact of the brake blocks 1 with the brake drums 2 in one direction and contact of the arms 9 with the pins 19 when moved outwardly by the action of the spring 18 so that there is only a small relative displacement of the pistons between the positions to which they are moved by fluid pressure admitted to the space between them and the positions to which they are brought by the spring 18 when the pressure is released. Thus for each application and release of a pair of brake blocks only a small amount of the actuating fluid flows into and out of the cylinder 15.

Figure 5:
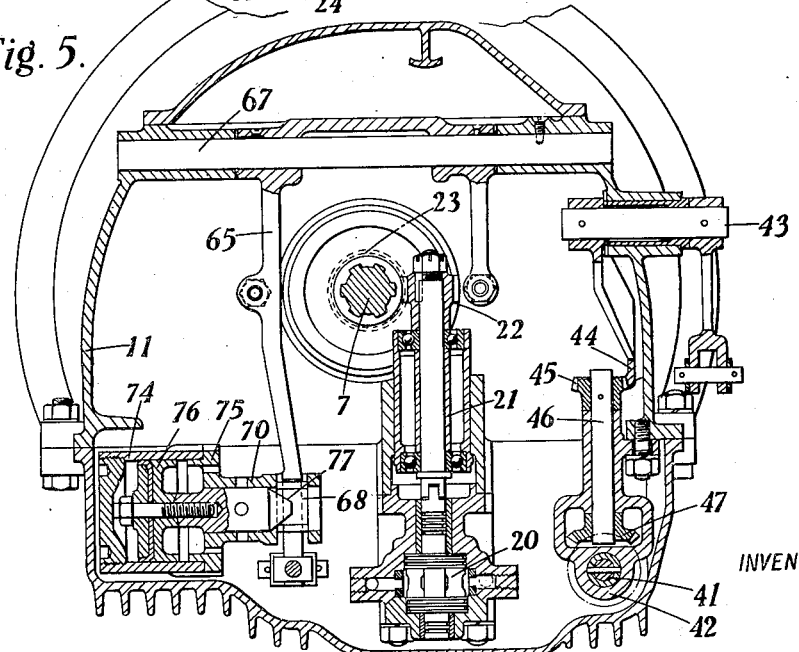
Figure 5 shows a section on the line 5—5, Figure 3.

A pump 20, preferably of the rotary type as shown in Figure 5, is actuated by a shaft 21 carrying a helical or like wheel 22 in gear with a wheel 23 on the driving shaft 7. This pump draws, for example, oil from the bottom of the casing 11 through a filter 24 and delivers it into a spring loaded reservoir 25. A relief valve is provided, as hereinafter described, whereby, when the reservoir is fully charged, excess oil delivered by the pump is used for lubrication and then returned into the bottom of the casing to be again drawn into the pump through the filter 24.

Oil from the reservoir 25 is led through a conduit 26 and a pipe connection 27 to a distribution passage 29 in a valve body 28, in which distribution passage a number of valves 30 are arranged for controlling the admission of oil through pipes 31 to each of the cylinders 15. The valves comprise seats 32 whereon the ball valves 30 are closed by the pressure in the passage 29 assisted by springs 33 carried in plugs 34. Access can thus be had to the valve seats 32 on removal of the said plugs.

Each ball valve 30 can be raised from its seat 32 by a hollow plunger 35 movable vertically in a tubular passage 36 below the valve seat, the diameter of the plunger being reduced at the end thereof adjacent to the ball valve so that, when the latter is raised from its seat, oil can flow from the distribution passage 29 through the annular space around the upper part of the plunger 35 into the pipe 31 leading to the cylinder 15 controlled by this valve.

As above mentioned, the plunger 35 is hollow and in addition is provided with a seat 37 on which the ball valve is supported when raised from the seat 32 in the valve body. Thus at such times the passage through the plunger is closed and there is no escape of oil from the distribution passage 29 into the relief passage or bore 38 of the plunger. If, however, the plunger is left unsupported at its outer end, the pressure of the oil, acting on the shoulder between the parts of the plunger of different diameter, forces the plunger away from the ball valve. Oil can then escape through the bore of the plunger and a lateral opening 39 into the casing 11. Instead of a hollow plunger with a bore 38 and a lateral opening 39 a relief passage may be formed in the wall of the tubular passage 36 which is uncovered when the plunger, acting as a piston valve, is moved to a suitable position or this relief passage may be provided in addition to the passages 38, 39 through the plunger.

It is to be noted that, in the event of there being a flaw in the metal of the valve seat 32 or grit or the like adhering to the valve seat 32 and preventing the valve from closing or cutting off the flow of oil out of the passage 29, the pressure in the corresponding cylinder 15 will not be maintained if the support of the plunger is removed, thereby eliminating all danger of the pressure in the cylinder being thus accidentally maintained when it is desired that the corresponding brake should be released by the brake blocks and allowed to rotate freely.

The valves controlling the pressure in the several cylinders are operated by means of cams 40 arranged on a cam shaft 41 which is supported in bearings 42 and is movable axially as well as rotatable therein. The cam faces of each of the cams 40 are so disposed relatively to one another and each of said cams is so disposed relatively to the other cams that by means of these cams the valves can be opened and closed singly or in groups to effect the required operation of the brake blocks 1 to put in operation the alternative trains of gearing as required to provide an appropriate velocity ratio between the driving and driven shafts.

The cam shaft 41 is rotatable by means of a shaft 43, which can be controlled manually and which carries a quadrant 44 in gear with a pinion 45 on a shaft 46 geared to the cam shaft 41 by bevel wheels 47. The cam shaft 41 is slidable axially in the bevel wheel 47 and the bearing 42, and a pin extending radially from the cam shaft extends into an axial slot in the hub of the said bevel wheel. By rotation of the shaft 43 the cams 40 are caused to operate the plungers 35 to close all the valves simultaneously or to open them in any order of sequence singly or in groups as may be required to effect the control of the brakes, and at the same time a cam 48 is correspondingly moved.

Figure 2:
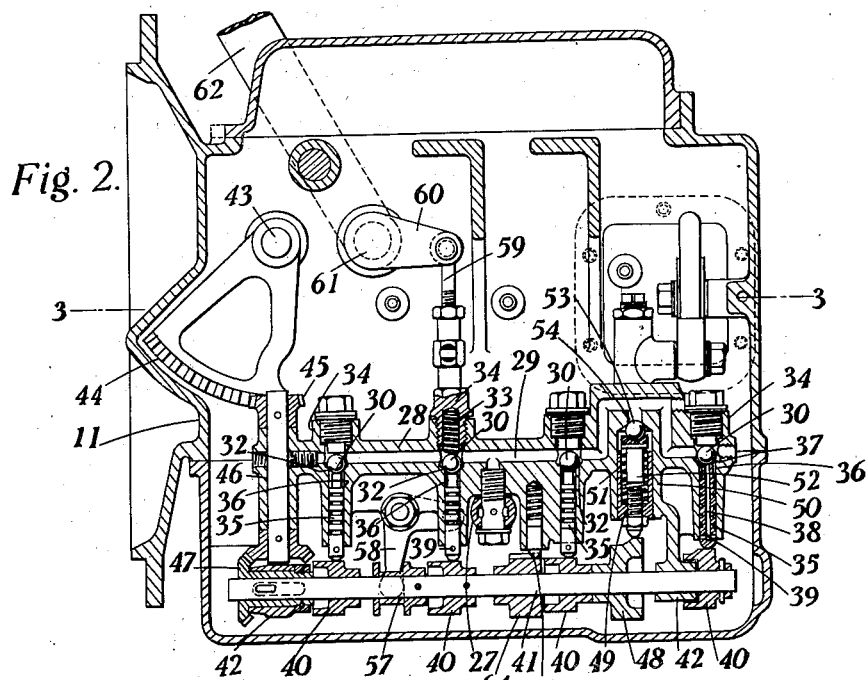
Figure 2 shows a vertical longitudinal section of the said controlling means on the centre line of a distribution passage and valves arranged therein, forming part of the said controlling means.
Figure 3:
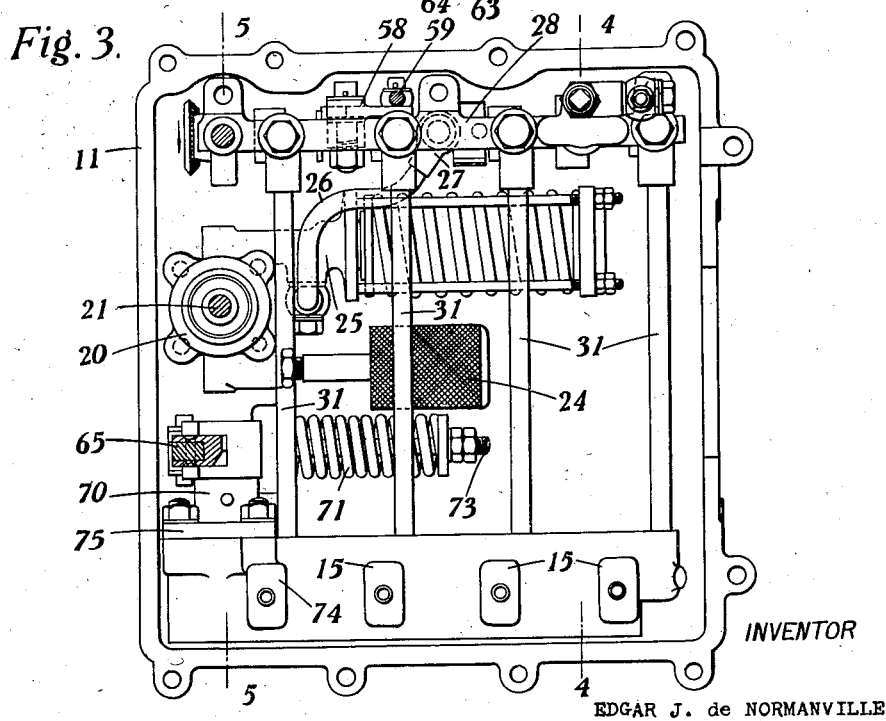
Figure 3 shows a plan of the said controlling means, corresponding to a section on the line 3—3, Figure 2.

Referring more particularly to Figure 2 it will be seen that this cam 48 on the cam shaft 41 is provided to move a plunger 49 in a plunger chamber 50, the plunger serving as an abutment for a spring 51 which supports a carrier 52 for a valve 53 adapted to regulate the pressure at which oil is allowed to escape through an outlet 54 from the distribution passage 29. The cam 48 can be moved to positions to allow the plunger 49 to move outwardly in the chamber 50 to different distances so that the compression of the spring 51 can be varied as required. The valve 53 can thus be maintained closed until a variable predetermined pressure in the distribution passage 29 is exceeded and further increase of pressure is prevented by the opening of the valve 53.

The oil passing through the valve 53 is led into a pipe 55 and passes through a spring loaded valve 56 into the lubrication system and is thence returned to the pump.

A simultaneous closing of all the valves 30 and corresponding adjustment of the compression of the spring 51 acting on the valve 53, or opening of the valves 30 in the required order and simultaneous adjustment of the compression of the spring 51, can be effected by an axial movement of the cam shaft 41 whereby suitable parts of the individual cams are brought opposite to the corresponding plungers. Axial movement of the cam shaft can be effected by means of a grooved collar 57 on the said shaft engaged by an arm 58 of a lever connected by a link 59 to an arm 60 on a rock shaft 61 carrying an operating lever 62. The shaft 41 can be yieldingly retained in different positions of axial or rotational adjustment by engagement of a spring latch 63 carried by the valve body 28 in a grooved or notched collar 64 mounted on the said shaft.

When all the valves 30 are closed, the transmission gear is inoperative since there will be no pressure in the cylinders 15 and all the brake shoes 1 will be disengaged from the drums 2 so that the driven shaft is free to rotate independently of the driving shaft. When any of the valves 30 is opened the oil in the corresponding pipe or pipes 31 is immediately put under the same pressure as that existing in the distribution passage 29, all the pipes previously standing filled. Thereafter in the continued movement of the shaft 41 the compression of the spring 51 can be more or less gradually increased so as to raise the pressure in the passage 29, the pump being in operation to supply oil to this pipe, until the pressure overcomes the resistance of the said spring and relieves the oil in the pipe 29 from further increase of pressure by allowing excess oil to escape through the valve 53. The rate of increase of the compression of the spring is controlled by the shape of the cam 48 and by the speed at which the shaft 41 is rotated, or moved axially. The pressure in the distribution passage can be so adjusted that when any of the valves 30 opens the corresponding brake block is brought into contact with its brake drum and thereafter the pressure in the supply pipe to the appropriate cylinder 15 is raised progressively.

The system of valves hereinabove described and the means for coordinating their movements can be applied to other controlling devices besides brake blocks. For example, fluid under pressure from the distribution passage 29 may be admitted to a cylinder 74 controlling the movements of a clutch lever 65 (Figure 6) for moving a clutch sleeve 66 (Figure 1) longitudinally on the driving shaft. The lever 65 is carried on a rock shaft 67 and is provided with a shoe plate 68 which is urged to a position in a gap 69 in a guide tube 70 by a spring 71 having an abutment on a fixed frame part 72, and acting on the lever through a link 73. The guide tube 70 is formed on the cover 75 of a cylinder 74 having a piston 76 movable therein by fluid pressure supplied through one of the valves 30. The rod of this piston is extended to provide a sliding cam 77 which acting on the shoe 68 moves the lever against the tension of the spring 71.

I claim:

1. Hydraulically operated control gear comprising a distribution passage, means for supplying fluid under pressure to said passage, a valve outlet passage, a valve seat and ball valve in said distribution passage and controlling the flow of fluid from the distribution passage to the valve outlet passage, a service pipe leading from the valve outlet passage to a cylinder, two pistons movable independently in the cylinder on opposite sides of the service pipe connection, a plunger movable into the valve outlet passage for unseating said ball valve, a relief passage formed through the plunger, and a valve seat on the plunger communicating with said relief passage and on which said ball valve seats to prevent the escape of fluid through the relief passage from the valve outlet passage when the said valve is raised from its seat in the distribution passage.

2. Hydraulically operated control gear comprising a valve outlet passage, a distribution passage, a ball valve and a seat therefor in the distribution passage for controlling the flow of fluid from the distribution passage to the valve outlet passage, a plunger extending into the said outlet passage, said plunger having an external shoulder, a relief passage extending through the plunger, a valve seat on said plunger and communicating with said relief passage on which the ball valve rests to close the relief passage when the ball valve is raised by the plunger from its seat in the distribution passage, means for moving the plunger and means coordinated with the movement of the plunger to vary the pressure of the fluid in the distribution passage.

3. Hydraulically operated control gear comprising a distribution passage, means for supplying fluid under pressure to this passage, a valve in the said passage, a cam operated plunger for opening the said valve, a cam movable axially and rotationally for operating the plunger, and means for varying the pressure in the distribution passage as the valve is moving to its open position.

4. Hydraulically operated control gear comprising a distribution passage, means for supplying fluid under pressure to said passage, a valve in said passage controlling the supply of fluid from the said passage to a member to be operated hydraulically, a plunger for opening the said valve, a spring loaded valve for regulating the pressure in the distribution passage, a cam shaft, means for moving the said cam shaft axially and rotationally and cams on said shaft for simultaneously actuating the plunger to open the first-named valve and varying the loading on the pressure regulating valve.

5. Hydraulically operated control gear comprising a distribution passage, means for supplying fluid under pressure to said passage, valves in said passage respectively controlling the supply of fluid to different hydraulically operated members, plungers for respectively opening said valves, a spring loaded valve regulating the pressure in the distribution passage, means for respectively actuating said plungers to open said valves, and means for varying the loading of the pressure valve when any of the fluid supply controlling valves is moved.

6. Hydraulically operated control gear comprising a distribution passage, means for supplying fluid under pressure to said passage, valves for distributing fluid from said passage to hydraulically operated members, separate means for opening each of the said valves, a spring loaded valve controlling the pressure of the fluid in the distribution passage and means for varying the loading of the said spring loaded valve in accordance with the movements of the distributing valves.

7. Hydraulically operated control gear comprising a distribution passage, a plurality of service pipes, cylinders supplied by the said service pipes, pistons movable in the said cylinder by fluid delivered between them, valves controlling the supply to the service pipes, plungers for separately opening the valves, relief passages traversing the plungers and closed when the plungers are in positions holding the said valves open, a spring loaded valve determining the pressure in the distribution passage, and cams coordinating the movements of the plungers and the loading of the spring loaded valve.

8. Hydraulically operated control gear comprising a distribution passage, service pipes supplying separate cylinders to move pistons provided therein, valve controlling the supply to the service pipes, relief passages for releasing the pressure in the cylinders, a valve held closed under variable spring pressure to determine the pressure in the distribution passage and cams movable axially and rotationally to effect the opening of the supply valves and simultaneously effect an adjustment of the loading of the valve determining the pressure in the distribution passage.

EDGAR JOSEPH de NORMANVILLE.